US008190346B2

(12) United States Patent
Lindqvist et al.

(10) Patent No.: US 8,190,346 B2
(45) Date of Patent: May 29, 2012

(54) DATA GENERATING SYSTEM

(75) Inventors: Kristian Lindqvist, Solna (SE); Magnus Eriksson, Södertälje (SE)

(73) Assignee: Scania CV AB (Publ) (SE)

( * ) Notice: Subject to any disclaimer, the term of this patent is extended or adjusted under 35 U.S.C. 154(b) by 805 days.

(21) Appl. No.: 12/096,813

(22) PCT Filed: Dec. 6, 2006

(86) PCT No.: PCT/SE2006/050546
§ 371 (c)(1),
(2), (4) Date: Oct. 9, 2008

(87) PCT Pub. No.: WO2007/069996
PCT Pub. Date: Jun. 21, 2007

(65) Prior Publication Data
US 2009/0055069 A1    Feb. 26, 2009

(30) Foreign Application Priority Data

Dec. 13, 2005   (SE) ..................... 0502819

(51) Int. Cl.
*B60T 7/12* (2006.01)
(52) U.S. Cl. .................... 701/96; 340/903; 180/170
(58) Field of Classification Search .............. 701/96, 701/117, 300, 301; 180/170; 340/903
See application file for complete search history.

(56) References Cited

U.S. PATENT DOCUMENTS

| | | | |
|---|---|---|---|
| 5,977,869 A | 11/1999 | Andreas | |
| 6,081,762 A * | 6/2000 | Richardson et al. | 701/93 |
| 6,161,074 A | 12/2000 | Sielagoski et al. | |
| 6,212,465 B1 | 4/2001 | Sielagoski et al. | |
| 6,493,625 B2 * | 12/2002 | Andreas et al. | 701/96 |
| 2002/0018003 A1 * | 2/2002 | Andreas et al. | 340/903 |
| 2002/0032514 A1 * | 3/2002 | Kuroda et al. | 701/96 |
| 2002/0138193 A1 | 9/2002 | Miyahara | |
| 2003/0090408 A1 * | 5/2003 | Matsuura | 342/70 |
| 2003/0187578 A1 * | 10/2003 | Nishira et al. | 701/301 |
| 2003/0204298 A1 | 10/2003 | Ahmed-Zaid et al. | |
| 2004/0104837 A1 * | 6/2004 | Samukawa et al. | 342/70 |

(Continued)

FOREIGN PATENT DOCUMENTS

DE        196 50 168 A1    6/1998

(Continued)

OTHER PUBLICATIONS

International Search Report dated Mar. 20, 2007 issued in corresponding PCT Application No. PCT/SE2006/050546.

(Continued)

*Primary Examiner* — Helal A Algahaim
(74) *Attorney, Agent, or Firm* — Ostrolenk Faber LLP

(57) ABSTRACT

A system and method for a host vehicle for generating distance between a host vehicle and a target object traveling in the predicted path of the host vehicle, and velocity data as to the velocity of the target object. When a target object is detected, distance data is set to correspond to a measured distance value, velocity data is set to correspond to a value based on a measured value of the relative velocity of the target object and the velocity of the host vehicle, and stored. When the target object ceases to be detectable when the host vehicle is traveling in a curve, a value of the distance between the host vehicle and the target object is repeatedly estimated based on latest distance and velocity data stored and the velocity of the host vehicle, whereupon the distance data is set to correspond to the estimated value and stored.

20 Claims, 3 Drawing Sheets

U.S. PATENT DOCUMENTS

| | | | |
|---|---|---|---|
| 2005/0010351 A1* | 1/2005 | Wagner et al. | 701/96 |
| 2005/0128133 A1* | 6/2005 | Samukawa et al. | 342/70 |
| 2005/0216171 A1* | 9/2005 | Heinrichs-Bartscher | 701/96 |
| 2005/0251313 A1* | 11/2005 | Heinrichs-Bartscher | 701/41 |
| 2009/0187290 A1* | 7/2009 | Moriizumi et al. | 701/1 |

FOREIGN PATENT DOCUMENTS

| | | |
|---|---|---|
| DE | 197 36 964 A1 | 3/1999 |
| DE | 100 06 403 A1 | 8/2001 |
| EP | 0 846 587 A1 | 6/1998 |
| EP | 1 110 792 A2 | 6/2001 |
| EP | 1112888 | 7/2001 |

OTHER PUBLICATIONS

Supplementary European Search Report dated Nov. 2, 2010 in corresponding European Application No. EP 06 82 4612.

* cited by examiner

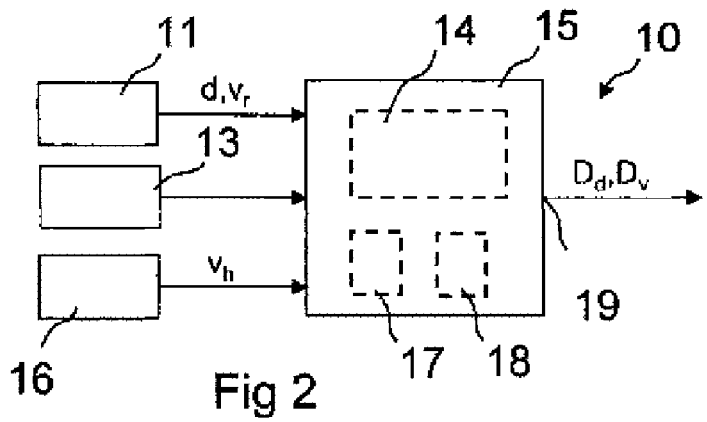
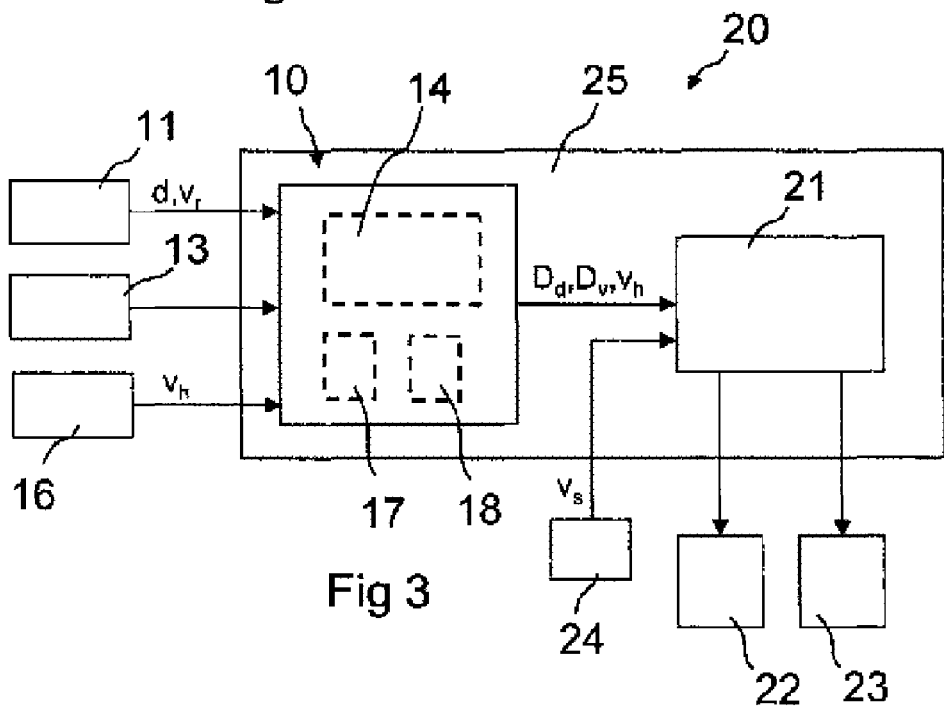
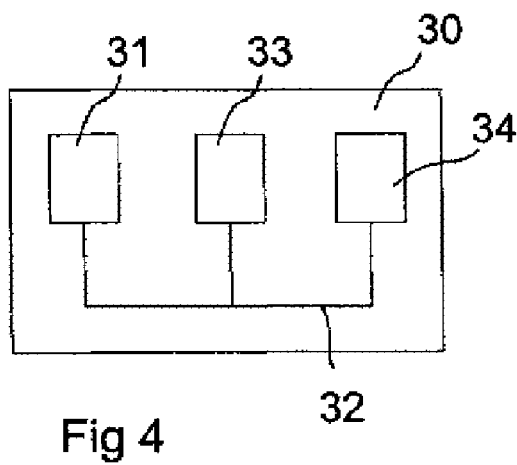

DATA GENERATING SYSTEM

CROSS REFERENCE TO RELATED APPLICATION

The present application is a 35 U.S.C. §§371 national phase conversion of PCT/SE2006/050546, filed 6 Dec. 2006, which claims priority of Swedish Application No. 0502819-6, filed 13 Dec. 2005. The PCT International Application was published in the English language.

BACKGROUND OF THE INVENTION

1. Technical Field

The present invention relates to a data generating system and a method to be used in a motor vehicle, here denominated host vehicle, for generating distance data as to the prevailing distance between the host vehicle and an object travelling in the predicted path of the host vehicle and velocity data as to the prevailing velocity of said object. The invention also relates to an adaptive cruise control system comprising such a data generating system. Furthermore, the invention relates to a computer program comprising computer program code for implementing the method, a computer program product comprising a data storage medium readable by an electronic control unit and having said computer program stored thereon, and an electronic control unit.

2. Background Art

An adaptive cruise control system for use in motor vehicles is previously known, e.g. from US 2003/0204298 A1. The motor vehicle provided with the adaptive cruise control system is in the following referred to as the "host vehicle". Under driving conditions with no other vehicle within a certain range in front of the host vehicle in the predicted travelling path thereof, the adaptive cruise control system, when activated by the vehicle driver, influences the operation of the host vehicle so as to keep the velocity of the host vehicle essentially equal to a desired vehicle velocity set by the driver, in the following referred to as the "set vehicle velocity". Under said driving conditions, the adaptive cruise control system operates in a conventional cruise control mode. When an obstructing object, such as another motor vehicle, travelling in the predicted path of the host vehicle at a velocity lower than the set vehicle velocity of the host vehicle is detected within the above-indicated range, the adaptive cruise control system reduces the velocity of the host vehicle and makes the host vehicle follow the detected object at a desired distance from it, i.e. the adaptive cruise control system will in this case influence the operation of the host vehicle so as to keep the host vehicle at a desired distance from the detected object. A detected object travelling in the predicted path of the host vehicle is in the following referred to as "target object" and said desired distance is in the following referred to as the "set distance". When the obstructing target object is accelerated to a velocity above the set vehicle velocity of the host vehicle or when it for any reason no longer is detectable in the predicted travelling path of the host vehicle and no other obstructing target object is detected, the adaptive cruise control system resumes the cruise control mode and accelerates the host vehicle back to the set vehicle velocity.

When a detected target object runs out of the field of view of the object detecting means included in a conventional adaptive cruise control system due to a sharp road curve, the adaptive cruise control system will accelerate the host vehicle back to the set vehicle velocity. Hereby, the host vehicle might get undesirably close to the target object and it might be necessary for the driver of the host vehicle to manually activate the breaks of the host vehicle, which will deactivate the adaptive cruise control system. There is also a risk of a dangerous accident in a situation of this type due to the undesired acceleration of the host vehicle. A solution to the problem of undesired acceleration of the host vehicle in this type of situation is disclosed in US 2003/0204298 A1. According to this solution, a resumption of the cruise control mode is inhibited and the prevailing velocity of the host vehicle is maintained when a previously detected target object is no longer detectable at the same time as it is established that the host vehicle is travelling in a curve.

SUMMARY OF THE INVENTION

The object of the present invention is to propose a system and a method enabling an alternative and appropriate solution to the above-indicated problem of undesired acceleration of a motor vehicle provided with an adaptive cruise control system.

This object is achieved by means of a data generating system of the invention and a method of the invention.

The inventive data generating system is to be used in a motor vehicle, here denominated host vehicle, for generating distance data as to the prevailing distance between the host vehicle and an object travelling in the predicted path of the host vehicle, here denominated target object, and velocity data as to the prevailing velocity of the target object. The system comprises:

object detecting means for detecting a target object within a field of view of the object detecting means and for establishing a distance value representing the prevailing distance between the host vehicle and a detected target object and a relative velocity value representing the prevailing relative velocity of the detected target object in relation to the host vehicle;

curve determining means for determining whether or not the host vehicle is travelling in a curve; and processing means adapted to receive information from the object detecting means as to the distance value and relative velocity value for a detected target object, information from the curve determining means as to whether or not the host vehicle is travelling in a curve, and information as to the prevailing velocity of the host vehicle.

According to the invention, the processing means of the data generating system is adapted:

when a target object is within the field of view of the object detecting means, to set the distance data to correspond to the distance value, to set the velocity data to correspond to a value determined based on the relative velocity value and the prevailing velocity of the host vehicle, and to store this distance data and velocity data in a memory; and to operate according to a simulation mode when information from the object detecting means indicates that the target object has run out of the field of view of the object detecting means at the same time as information from the curve determining means indicates that the host vehicle is travelling in a curve, the processing means when operating in the simulation mode being adapted to repeatedly estimate a value of the prevailing distance between the host vehicle and the target object based on the latest distance data and velocity data stored in the memory and the prevailing velocity of the host vehicle, to set the distance data to correspond to this estimated value, and to store this distance data in the memory.

The distance data and velocity data generated by the system is intended to be used in an adaptive cruise control system, which is adapted to generate control signals for engine control means and brake control means of the host vehicle based on inter alia the distance data and velocity data so as to control the velocity of the host vehicle in dependence on the distance data and velocity data.

The inventive solution implies that the value of the distance between the host vehicle and a target object is repeatedly estimated and updated following the "disappearance" of the target object in a road curve based on the latest value of the velocity of the target object established before the target object was lost by the object detecting means and the latest established value of said distance. Hereby, an adjustment of the velocity of the host vehicle in dependence on the velocity of a target object initiated by an adaptive cruise control system supplied with distance data and velocity data from the inventive data generating system may be allowed to be continued for a while when the target object is lost by the object detecting means in a road curve. An ongoing retardation of the host vehicle initiated by the adaptive cruise control system due to a detected target object will for instance be allowed to be continued after the disappearance of the target object from the field of view of the object detecting means. This results in a smooth operation of the host vehicle when the target object is lost in a road curve. If the lost target object is detected anew within a relatively short period of time after the initiation of the simulation mode without having changed its velocity to any significant extent during this period of time, the host vehicle may operate smoothly also when the simulation mode is interrupted and the normal operational mode resumed. In contrast, the solution suggested in US 2003/0204298 A1, according to which a resumption of the cruise control mode is inhibited and the prevailing velocity of the host vehicle is maintained when the target object is lost in a road curve, is in many situations likely to result in a jerky operation of the host vehicle when a target object is lost in a road curve and detected anew.

The invention also relates to a computer program, a computer program product and an electronic control unit.

BRIEF DESCRIPTION OF THE DRAWINGS

The invention will in the following be more closely described by means of embodiment examples, with reference to the appended drawings, where:

FIG. 2 is a schematical outline diagram illustrating a data generating system according to the present invention, FIG. 3 is a schematical outline diagram illustrating an adaptive cruise control system according to the present invention, FIG. 4 is a schematical outline diagram of an electronic control unit for implementing a method according to the invention.

MODE(S) FOR CARRYING OUT THE INVENTION

Figure 1:
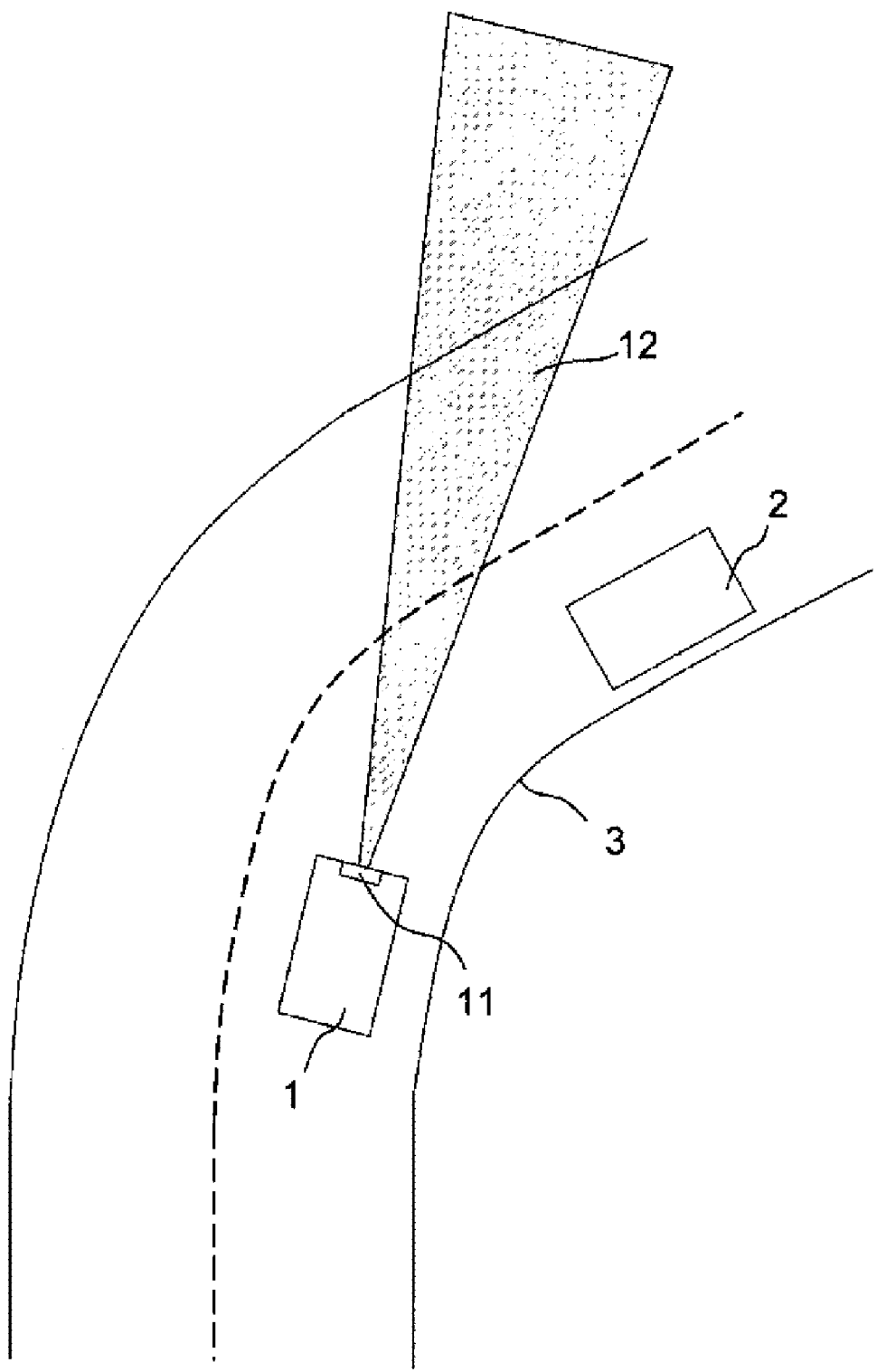
FIG. 1 is schematical planar view of a host vehicle travelling in a road curve.

The data generating system according to the present invention is to be used in a motor vehicle 1, here denominated host vehicle, for generating distance data $D_d$ as to the prevailing distance between the host vehicle and an object 2 travelling in the predicted path of the host vehicle, here denominated target object, and velocity data $D_v$ as to the prevailing velocity of the target object 2. FIG. 1 illustrates a host vehicle 1 travelling in a road curve 3 with a previously detected target object 2 in the form of another motor vehicle travelling in front of the host vehicle 1 in the predicted path thereof. The host vehicle is for instance a car, a lorry, a towing vehicle or a bus.

A data generating system 10 according to the present invention is illustrated very schematically in FIG. 2. This system comprises object detecting means 11 for detecting a target object within a field of view of the object detecting means and for establishing a distance value d representing the prevailing distance between the host vehicle 1 and a detected target object 2 and a relative velocity value $v_r$ representing the prevailing relative velocity of the detected target object 2 in relation to the host vehicle 1. The field of view 12 covered by the object detecting means is illustrated by the dashed area in FIG. 1. The object detecting means 11 may be of any type suitable for use in an adaptive cruise control system. Thus, conventional object detecting means of the type used or suggested for use in prior art adaptive cruise control systems may be used. The main requirement of the object detecting means 11 is that it shall be able to give measuring values allowing the distance d between a detected target object and the host vehicle 1 and the relative velocity $v_r$ of a detected target object in relation to the host vehicle 1 to be established. The object detecting means 11 may comprise one or several sensors that directly measure said distance d and said relative velocity $v_r$ or may be provided with processing means, e.g. in the form of one or several central processing units (CPU:s), for establishing said distance d and said relative velocity $v_r$ based on measuring signals from one or several sensors included in the object detecting means. The object detecting means 11 may for instance comprise one or several radar units or one or several lidar units or one or several camera units.

The data generating system 10 further comprises curve determining means 13 for determining whether or not the host 1 vehicle is presently travelling in a curve. The curve determining means 13 may comprise a yaw rate sensor of conventional type for sensing the yaw rate of the host vehicle 1. In this case, it is established that the host vehicle 1 is travelling in a curve when the yaw rate measured by the yaw rate sensor exceeds a given threshold value. The curve determining means 13 may also use information from a GPS-based navigation system in order to establish whether or not the host vehicle is presently travelling in a road curve.

The data generating system 10 further comprises processing means 14 adapted to receive information from the object detecting means 11 as to the above-indicated distance value d and relative velocity value $v_r$ for a detected target object, information from the curve determining means 13 as to whether or not the host vehicle is travelling in a curve, and information as to the prevailing velocity $v_h$ of the host vehicle 1. The processing means 14 may e.g. be constituted by a central processing unit (CPU) of an electronic control unit 15 of the host vehicle 1. The processing means 14 may also comprise two or more central processing units. Information as to the prevailing velocity $v_h$ of the host vehicle 1 may be supplied to the processing means 14 directly from a velocity sensor arranged to sense the vehicle velocity or from a control unit 16 connected to such a velocity sensor.

When the processing means 14 receives information from the object detecting means 11 indicating that a target object 2 is within the field of view 12 of the object detecting means 11, the processing means 14 is adapted to:

a) set the distance data $D_d$ to correspond to the above-indicated distance value d established by the object detecting means 11;

b) determine a velocity value $v_t$ representing the velocity of the detected target object by calculations based on the above-indicated relative velocity value $v_r$ established by the object detecting means 11 and the prevailing velocity $v_h$ of the host vehicle 1;

c) set the velocity data $D_v$ to correspond to the determined velocity value $v_t$; and d) store this distance data $D_d$ and velocity data $D_v$ in a memory 17 included in the inventive system 10.

The processing means 14 is adapted to repeatedly carry out the above-indicated measures a)-d) as long as the target object 2 remains in the predicted path of the host vehicle 1 within the field of view 12 of the object detecting means 11.

The memory 17 and the processing means 14 are suitably included in one and the same electronic control unit 15, as illustrated in FIG. 1. The distance data $D_d$ and velocity data $D_v$ stored in the memory 17 is repeatedly updated by storing in the memory 17 the latest distance data $D_d$ and velocity data $D_v$ established by the processing means 14. In the illustrated embodiment, the latest distance data $D_d$ and velocity data $D_v$ established by the processing means 14 is supplied via an output 19 of the control unit 15 for use by a control system of the host vehicle 1.

When the processing means 14 receives information from the object detecting means 11 indicating that a detected target object 2 has run out of the field of view 12 of the object detecting means 11 without having received any information from the curve determining means 13 indicating that the host vehicle 1 is travelling in a curve, the processing means 14 is adapted reset the distance data $D_d$ and velocity data $D_v$ stored in the memory 17.

When the processing means 14 receives information from the object detecting means 11 indicating that a detected target object 2 has run out of the field of view 12 of the object detecting means 11 at the same time as the information from the curve determining means 13 indicates that the host vehicle 1 is travelling in a curve, the processing means 14 is adapted to start operating according to a simulation mode. When operating in the simulation mode, the processing means 14 is adapted to repeatedly:

estimate a value of the prevailing distance between the host vehicle 1 and the target object 2 based on the latest distance data $D_d$ and velocity data $D_v$ stored in the memory 17 and the prevailing velocity $V_h$ of the host vehicle;

set the distance data $D_d$ to correspond to the estimated value; and store this distance data $D_d$ in the memory 17.

When operating in the simulation mode, the processing means 14 is adapted to keep the velocity data $D_v$ constant, i.e. to let the latest velocity data $D_v$ established and stored before the initiation of the simulation mode remain stored in the memory 17 and refrain from updating this velocity data $D_v$. Thus, the velocity $v_t$ of the target object 2 is considered to remain unchanged during the simulation mode and the prevailing value of the distance between the host vehicle 1 and the target object 2 is repeatedly calculated based on this assumed velocity $v_t$ of the target object, the prevailing velocity $v_h$ of the host vehicle 1 and the latest established value of the distance between the host vehicle and the target object.

The system comprises time measuring means 18 for measuring the time elapsed since the last initiation of a simulation mode. The processing means 14 is adapted to interrupt an initiated simulation mode and reset the distance data $D_d$ and velocity data $D_v$ stored in the memory 17 if no target object 2 has been detected anew by the object detecting means 11 when either of the following occurs:

the processing means 14 receives information from the curve determining means 13 indicating that the host vehicle 1 is no longer travelling in a curve, or it is established that a predetermined period of time has elapsed since the initiation of the simulation mode.

The processing means 14 is adapted to interrupt an initiated simulation mode when the information from the object detecting means 11 indicates that a target object 2, either the previously detected target object or a new target object, is anew detected within the field of view 12 of the object detecting means. In this case, the processing means 14 will resume carrying out the above-indicated measures a)-d).

An adaptive cruise control system 20 according to the present invention is schematically illustrated in FIG. 3. The adaptive cruise control system comprises signal generating means 21 for generating control signals for engine control means 22 and brake control means 23 of the host vehicle 1 so as to keep the velocity $V_h$ of the host vehicle essentially equal to a set vehicle velocity $v_s$ when no target object travelling in the predicted path of the host vehicle 1 at a velocity lower than the set vehicle velocity $v_s$ is detected and, when a target object 2 travelling in the predicted path of the host vehicle 1 at a velocity lower than the set vehicle velocity $v_s$ is detected, keep the host vehicle 1 at a set distance $d_s$ from the target object 2.

Said engine control means 22 may be an engine control unit of the host vehicle and said brake control means 23 may be a brake control unit of the host vehicle.

The adaptive cruise control system 20 comprises a data generating system 10 of the above-indicated type and the signal generating means 21 is adapted to establish the control signals based on the distance data $D_d$ and velocity data $D_v$ received from the data generating system 10, and information as to the set vehicle velocity $v_s$ and the prevailing velocity $V_h$ of the host vehicle. The control signals are established by the signal generating means 21 in a conventional manner known by persons skilled in the art. When the distance data $D_d$ and velocity data $D_v$ are reset, this is to indicate that no obstructing target object is detected in the predicted path of the host vehicle. Thus, when the signal generating means 21 receives information indicating that the distance data $D_d$ and velocity data $D_v$ are reset, the signal generating means 21 will generate control signals that will keep the velocity of the host vehicle 1 essentially equal to the set vehicle velocity $v_s$.

The desired vehicle velocity $v_s$, here denominated set vehicle velocity, is set by the driver of the host vehicle 1 by means of velocity setting means 24. The velocity setting means 24 may for instance comprise a set member, such as a depressible switch, to be actuated by the driver when the host vehicle is running at a velocity which the driver wants to maintain. By actuation of the set member, the prevailing velocity of the host vehicle is entered as the value of the set vehicle velocity and the adaptive cruise control system is activated. The set distance $d_s$ is a given distance to be maintained between the host vehicle 1 and a detected target object. The set distance $d_s$ may be fixed or may be adjustable. The set distance $d_s$ may be adjustable either automatically, for example through means of the electronic control unit 15 or 25 executing pre-stored instructions for a set distance varying depending on prevailing traffic conditions as sensed through the described object detecting means 11 or it may be adjusted manually, for example by the host vehicle driver operating a distance setting means (not shown). For a manual adjustment, the distance setting means may for instance comprise a set member, such as a depressible switch or button, to be actuated by the host vehicle driver when the host vehicle is running at a distance from a target vehicle which the driver wants to maintain. Alternatively, the distance setting means comprises a display on which a distance level may be displayed and set manually by the driver via manipulating a switch or lever. The display then for example may show a distance level scale from 1 to 5, where each step on the scale may represent a certain distance in meters or as a time interval in seconds to be maintained to the target vehicle. The operation of the adaptive cruise control system 20 may be interrupted in a conventional manner, e.g. by the actuation of a throttle lever or a brake lever by the driver of the host vehicle.

The signal generating means 21 may e.g. be constituted by a central processing unit (CPU) of an electronic control unit 25 of the host vehicle 1. The processing means 14 and memory 17 of the data generating system 10 may be integrated in one and the same unit as the signal generating means 21, but may of course also be arranged as or in a separate unit, which is connected to the signal generating means 21 so as to send information thereto as to the distance data $D_d$ and velocity data $D_v$.

Figure 5:
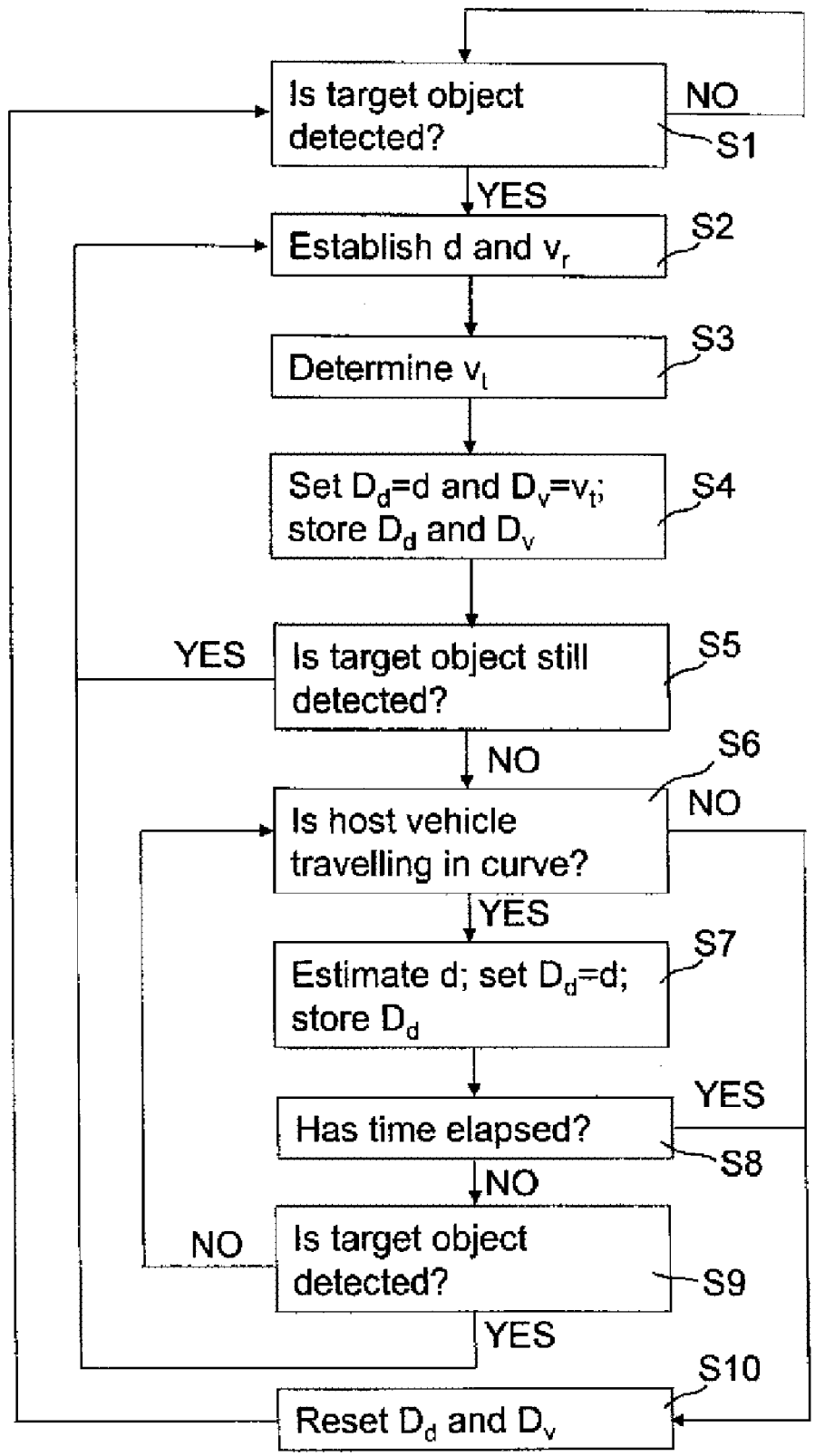
FIG. 5 is a flow diagram illustrating a method according to an embodiment of the invention.

A flow diagram illustrating a method according to an embodiment of the invention is shown in FIG. 5. In a first step S1, it is repeatedly controlled whether or not a target object 2 is detected within a field of view 12 of an object detecting means 11 mounted to the host vehicle 1. If a target object is detected, a distance value d representing the prevailing distance between the host vehicle 1 and the detected target object 2 and a relative velocity value $v_r$ representing the prevailing relative velocity of the detected target object 2 in relation to the host vehicle 1 are established in a second step S2. A velocity value $v_t$ representing the velocity of the detected target object 2 is then established in a third step S3 by calculations based on the relative velocity value $v_r$ and the prevailing velocity $v_h$ of the host vehicle 1. Thereafter, in a fourth step S4, the distance data $D_d$ is set to correspond to the distance value d and the velocity data $D_v$ is set to correspond to the velocity value $v_t$ and these data $D_d$, $D_v$ are stored in a memory 17. In a fifth step S5, it is then determined whether or not the target object 2 is still detected. The steps S2-S4 are repeatedly carried out as long as the target object 2 remains detectable within the field of view of the object detecting means 11. If it is established in step S5 that the target object 2 is no longer detectable within the field of view of the object detecting means 11 and established in a sixth step S6 that the host vehicle 1 is travelling in a curve, the above-indicated simulation mode is initiated in a seventh step S7, which implies that a value of the prevailing distance between the host vehicle 1 and the target object 2 is established based on the latest distance data $D_d$ and velocity data $D_v$ stored in the memory 17 and the prevailing velocity $v_h$ of the host vehicle, and that the distance data $D_d$ is set to correspond to this estimated value and stored in the memory 17. In an eight step S8, it is then determined whether or not a predetermined period of time has elapsed since the initiation of the simulation mode. If it is established that the predetermined period of time has not elapsed, it is then in a ninth step S9 determined whether or not the previously detected target object 2 or a new target object is detected within the field of view of the object detecting means 11. The simulation in step S7 is repeated until it is established in any of steps S6, S8 and S9 that the host vehicle 1 is no longer travelling in a curve, that the predetermined period of time has elapsed or that a target object is anew detected. If it is established in step S6 that the host vehicle 1 is not travelling in a curve or in step S8 that the predetermined period of time has elapsed, the distance data $D_d$ and velocity data $D_v$ are reset in a final step S10, whereupon the detection of a new target object is awaited in step S1. If it is established in step S9 that a target object is anew detected, the above-indicated steps S2-S4 are resumed.

Computer program code for implementing a method according to the invention is suitably included in a computer program, which is loadable directly into the internal memory of a computer, such as the internal memory of an electronic control unit of the host vehicle. Such a computer program is suitably provided via a computer program product comprising a data storage medium readable by an electronic control unit, which data storage medium has the computer program stored thereon. Said data storage medium is for instance an optical data storage medium in the form of a CD-ROM disc, a DVD disc etc, a magnetic data storage medium in the form of a hard disc, a diskette, a cassette tape etc, or a memory of the type ROM, PROM, EPROM or EEPROM or a Flash memory.

The computer program according to the invention comprises computer program code for causing a computer of a motor vehicle 1, here denominated host vehicle:

to determine or receive a first velocity value $v_h$ representing the prevailing velocity of the host vehicle 1;

to determine or receive a distance value d representing the distance between the host vehicle 1 and a detected object 2 travelling in the predicted path of the host vehicle, here denominated target object, within a field of view 12 of an object detecting means 11, and a second velocity value $v_t$ representing the velocity of the detected target object 2;

to set distance data $D_d$ to correspond to said distance value d and set velocity data $D_v$ to correspond to said second velocity value $v_t$, when the target object 2 is within the field of view of the object detecting means 11;

to store the latest distance data $D_d$ and velocity data $D_v$ in a memory 17;

to determine whether or not the host vehicle 1 is travelling in a curve or receive information about that;

to initiate a simulation mode when it is established that the target object 2 has run out of the field of view 12 of the object detecting means 11 at the same time as it is established that the host vehicle 1 is travelling in a curve;

and, when in said simulation mode, to repeatedly estimate a value of the prevailing distance between the host vehicle 1 and the target object 2 based on the latest distance data $D_d$ and velocity data $D_v$ stored in the memory 17 and the first velocity value $V_h$, set the distance data $D_d$ to correspond to this estimated value, and store this distance data $D_d$ in the memory 17.

FIG. 4 very schematically illustrates an electronic control unit 30 comprising an execution means 31, such as a central processing unit (CPU), for executing computer software. The execution means 31 communicates with a memory 33, for instance of the type RAM, via a data bus 32. The control unit 30 also comprises data storage medium 34, for instance in the form of a memory of the type ROM, PROM, EPROM or EEPROM or a Flash memory. The execution means 31 communicates with the data storage medium 34 via the data bus 32. A computer program comprising computer program code for implementing a method according to the invention is stored on the data storage medium 34.

The invention is of course not in any way restricted to the embodiments described above. On the contrary, many possibilities to modifications thereof will be apparent to a person with ordinary skill in the art without departing from the basic idea of the invention as defined in the appended claims.

The invention claimed is:

1. A data generating system to be used in a host motor vehicle for generating distance data ($D_d$) as to a prevailing distance between the host vehicle and a target object traveling in a predicted path of the host vehicle and velocity data ($D_v$) as to a prevailing velocity of the target object, said system comprising:

an object detecting apparatus that is configured to detect the target object within a field of view of the object detecting apparatus and that is configured to establish a distance value (d) representing the prevailing distance between the host vehicle and the detected target object and a relative velocity value ($v_r$) representing a prevailing relative velocity of the detected target object in relation to the host vehicle;

a curve determining apparatus configured to determine whether or not the host vehicle is traveling in a curve; and a processor configured to receive information from the object detecting apparatus as to the distance value (d) and relative velocity value ($v_r$) for a detected target object, information from the curve determining apparatus as to whether or not the host vehicle is traveling in a curve, and information as to the prevailing velocity ($v_h$) of the host vehicle, a memory that stores latest distance data ($D_d$) and velocity data ($D_v$) established by the processor when a target object is within the field of view of the object detecting apparatus, the processor is configured to set the distance data ($D_d$) to correspond to the distance value (d), to set the velocity data ($D_v$) to correspond to a value determined based on the relative velocity value ($v_r$) and the prevailing velocity ($v_h$) of the host vehicle, and to store the latest distance data ($D_d$) and velocity data ($D_v$) in the memory; and when information from the object detecting apparatus indicates that the target object has run out of the field of view of the object detecting apparatus at the same time as information from the curve determining apparatus indicates that the host vehicle is traveling in a curve, the processor is configured to start operating according to a simulation mode, and when operating in the simulation mode the processor is configured to repeatedly estimate a value of the prevailing distance between the host vehicle and the target object based on the latest distance data ($D_d$) and velocity data ($D_v$) stored in the memory and the prevailing velocity ($v_h$) of the host vehicle, to set the distance data ($D_d$) to correspond to the estimated value, and to store the distance data (Dd) in the memory.

2. The data generating system according to claim 1, wherein when the processor is operating in the simulation mode, the processor is configured to keep the velocity data ($D_v$) constant.

3. The data generating system according to claim 2, wherein when the information from the curve determining apparatus indicates that the host vehicle is no longer traveling in a curve, the processor is configured to interrupt an initiated simulation mode and reset the distance data ($D_d$) and velocity data ($D_v$) stored in the memory.

4. The data generating system according to claim 2, wherein when a predetermined period of time has elapsed since the initiation of the simulation mode, the processor is configured to interrupt an initiated simulation mode.

5. The data generating system according to claim 2, wherein when the information from the object detecting apparatus indicates that a target object is anew detected within the field of view of the object detecting apparatus, the processor is configured to interrupt an initiated simulation mode.

6. The data generating system according to claim 1, wherein the curve determining apparatus comprises a yaw rate sensor that senses a yaw rate of the host vehicle.

7. The data generating system according to claim 1, wherein the object detecting apparatus comprises at least one of a radar unit, a lidar unit and a camera unit and configured to establish the distance (d) to and the relative velocity ($v_r$) of a detected target object.

8. An adaptive cruise control system be used in a host motor vehicle, the host motor vehicle including an engine, an engine control for controlling engine operation, a brake and a brake control for the brake;

the system comprising:

a signal generator operable for generating control signals for an engine control and a brake control of the host vehicle so as to keep a velocity of the host vehicle essentially equal to a set vehicle velocity ($v_s$) when no target object traveling in a predicted path of the host vehicle at a velocity lower than the set vehicle velocity ($v_s$) is detected and, whereas when a target object traveling in the predicted path of the host vehicle at a velocity lower than the set vehicle velocity ($v_s$) is detected, to keep the host vehicle at a set distance ($d_s$) from the target object, wherein the adaptive cruise control system comprises a data generating system according to claim 1, and the signal generating apparatus is operable to establish the control signals based on distance data ($D_d$) and velocity data ($D_v$) received from the data generating system and information as to the set vehicle velocity ($v_s$) and the prevailing velocity ($v_h$) of the host vehicle.

9. A method to be used in a host motor vehicle, for generating distance data ($D_d$) as to a prevailing distance between the host vehicle and a target object traveling in a predicted path of the host vehicle and velocity data ($D_v$) as to a prevailing velocity of the target object, the method comprising the steps of:

detecting a target object within a field of view of the host vehicle and establishing a distance value (d) representing a prevailing distance between the host vehicle and a detected target object and a relative velocity value ($v_r$) representing a prevailing relative velocity of the detected target object in relation to the host vehicle;

setting the distance data ($D_d$) to correspond to the distance value (d) and setting the velocity data ($D_v$) to correspond to a value determined based on the relative velocity value ($v_r$) and the prevailing velocity ($v_h$) of the host vehicle, when the target object is within the field of view of the host vehicle;

storing latest distance data ($D_d$) and velocity data ($D_v$) in a memory;

determining whether or not the host vehicle is traveling in a curve; and initiating a simulation mode when it is established that the target object has run out of the field of view of the host vehicle and that the host vehicle is traveling in a curve, said simulation mode comprising the steps of repeatedly estimating a value of the prevailing distance between the host vehicle and the target object based on the latest distance data ($D_d$) and velocity data ($D_v$) stored in the memory and the prevailing velocity ($v_h$,) of the host vehicle, setting by a processor the distance data ($D_d$) to correspond to this estimated value, and storing this distance data ($D_d$) in the memory.

10. The method according to claim 9, wherein when in said simulation mode, the velocity data ($D_v$) is kept constant.

11. The method according to claim 9, further comprising interrupting an initiated simulation mode and resetting the distance data ($D_d$) and velocity data ($D_v$) stored in the memory when it is established that the host vehicle is no longer-traveling in a curve.

12. The method according to claim 9, further comprising interrupting an initiated simulation mode and resetting the distance data ($D_d$) and velocity data ($D_v$) stored in the memory when a predetermined period of time has elapsed since the initiation of the simulation mode.

13. The method according to claim 9, further comprising interrupting an initiated simulation mode when a target object is anew detected within the field of view of the host vehicle.

14. A non-transitory computer readable medium comprises a computer program, wherein the computer program comprises computer program code for causing a computer:
to determine or receive a first velocity value ($v_h$,) representing the prevailing velocity of the host vehicle;
to determine or receive a distance value (d) representing the distance between the host vehicle and a detected target object traveling in the predicted path of the host vehicle, within a field of view of the host vehicle and a second velocity value (vt) representing the velocity of the detected target object;
to set distance data ($D_d$) to correspond to said distance value (d) and set velocity data ($D_v$) to correspond to said second velocity value ($v_t$), when the target object is within the field of view of the host vehicle;
to store the latest distance data ($D_d$) and velocity data ($D_v$) in a memory;
to determine whether or not the host vehicle is traveling in a curve or to receive information about that;
to initiate a simulation mode when it is established that the target object has run out of the field of view of the target vehicle at the same time as it is established that the host vehicle is traveling in a curve;
and, when in said simulation mode, to repeatedly estimate a value of the prevailing distance between the host vehicle and the target object based on the latest distance data ($D_d$) and velocity data ($D_v$) stored in the memory and the first velocity value ($v_h$), set the distance data ($D_d$) to correspond to this estimated value, and store this distance data ($D_d$) in the memory.

15. The non-transitory computer readable medium according to claim 14, wherein the computer program comprises computer program code that, when executed, cause the computer to keep the velocity data ($D_v$) constant when in said simulation mod.

16. The non-transitory computer readable medium according to claim 14, wherein the computer program comprises computer program code that, when executed, cause the computer to interrupt an initiated simulation mode and reset the distance data ($D_d$) and velocity data ($D_v$) stored in the memory when it is established that the host vehicle is no longer traveling in a curve.

17. The non-transitory computer readable medium according to claim 14, wherein the computer program comprises computer program code that, when executed, cause the computer to interrupt an initiated simulation mode and reset the distance data ($D_d$) and velocity data ($D_v$) stored in the memory when it is established that a predetermined period of time has elapsed since the initiation of the simulation mode.

18. The non-transitory computer readable medium according to claim 14, wherein the computer program comprises computer program code that, when executed, cause the computer to interrupt an initiated simulation mode when a target object is anew detected within the field of view of the host vehicle.

19. The non-transitory computer readable medium product comprising a data storage medium readable by an electronic control unit, a computer program according to claim 14 stored on said data storage medium.

20. The electronic control unit comprising an execution apparatus, a memory connected to the execution apparatus and a non-transitory data storage medium connected to the execution apparatus, and a computer program according to claim 14 stored on the non-transitory data storage medium.

* * * * *